(12) United States Patent
Lee et al.

(10) Patent No.: US 10,382,682 B2
(45) Date of Patent: Aug. 13, 2019

(54) IMAGING DEVICE AND METHOD OF OPERATING THE SAME

(71) Applicant: SAMSUNG ELECTRONICS CO., LTD., Suwon-si, Gyeonggi-do (KR)

(72) Inventors: Jin-won Lee, Seongnam-si (KR); Yong-hee Lee, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 205 days.

(21) Appl. No.: 15/002,551

(22) Filed: Jan. 21, 2016

(65) Prior Publication Data

US 2017/0013194 A1 Jan. 12, 2017

(30) Foreign Application Priority Data

Jul. 9, 2015 (KR) .......................... 10-2015-0097865

(51) Int. Cl.
| | |
|---|---|
| H04N 5/232 | (2006.01) |
| H04N 5/225 | (2006.01) |
| G06F 3/0487 | (2013.01) |
| G06F 3/01 | (2006.01) |
| G06F 3/0484 | (2013.01) |

(52) U.S. Cl.
CPC ......... *H04N 5/23241* (2013.01); *G06F 3/013* (2013.01); *G06F 3/017* (2013.01); *G06F 3/0487* (2013.01); *G06F 3/04847* (2013.01); *H04N 5/2251* (2013.01); *H04N 5/23245* (2013.01); *H04N 5/23293* (2013.01); *G06F 2203/04806* (2013.01)

(58) Field of Classification Search
CPC .......... H04N 5/23245; H04N 5/23241; H04N 5/23216; H04N 5/2257; G06F 2203/00–04113; G06F 3/00–047
USPC .................................... 348/374, 372, 333.01
See application file for complete search history.

(56) References Cited

U.S. PATENT DOCUMENTS

| | | | | |
|---|---|---|---|---|
| 6,686,967 | B1 * | 2/2004 | Yamamoto | ........... H04N 5/2252 |
| | | | | 348/211.4 |
| 7,519,289 | B2 | 4/2009 | Sakurai | |
| 2001/0043271 | A1 | 11/2001 | Kawano | |
| 2005/0052553 | A1 * | 3/2005 | Kido | ...................... H04N 5/232 |
| | | | | 348/296 |

(Continued)

FOREIGN PATENT DOCUMENTS

| | | |
|---|---|---|
| EP | 2 315 101 | 4/2011 |
| JP | 2004-117845 | 4/2004 |

OTHER PUBLICATIONS

Search Report and Written Opinion dated May 17, 2016 in counterpart International Patent Application No. PCT/KR2016/000520.

(Continued)

*Primary Examiner* — Xi Wang
(74) *Attorney, Agent, or Firm* — Nixon & Vanderhye, P.C.

(57) ABSTRACT

An imaging device is provided including detection circuitry configured to detect a grip force applied to an imaging device; and a controller configured to set a reference force based on at least one of weight information of a lens mounted on the imaging device and base grip force information and to operate in an imaging ready mode when the detected grip force is equal to or greater than the reference force.

23 Claims, 19 Drawing Sheets

(56) References Cited

U.S. PATENT DOCUMENTS

| | | | |
|---|---|---|---|
| 2008/0069555 A1* | 3/2008 | Lin | G03B 17/02 |
| | | | 396/502 |
| 2012/0088544 A1* | 4/2012 | Bentley | A63F 13/06 |
| | | | 455/556.1 |
| 2012/0105572 A1 | 5/2012 | Sammon | |
| 2012/0116548 A1* | 5/2012 | Goree | A61B 5/1118 |
| | | | 700/90 |
| 2012/0229661 A1* | 9/2012 | Sekiguchi | A61B 5/0205 |
| | | | 348/208.4 |
| 2013/0083228 A1 | 4/2013 | Iwatani | |
| 2013/0147706 A1 | 6/2013 | Kim et al. | |
| 2014/0032880 A1 | 1/2014 | Ka | |
| 2014/0168494 A1* | 6/2014 | Hong | G06F 1/3287 |
| | | | 348/333.01 |
| 2014/0317722 A1 | 10/2014 | Tartz et al. | |
| 2014/0361979 A1 | 12/2014 | Woo et al. | |

OTHER PUBLICATIONS

Extended Search Report dated Mar. 22, 2018 in counterpart European Patent Application No. 16821508.5.

\* cited by examiner

FIG. 2A
FIG. 2B
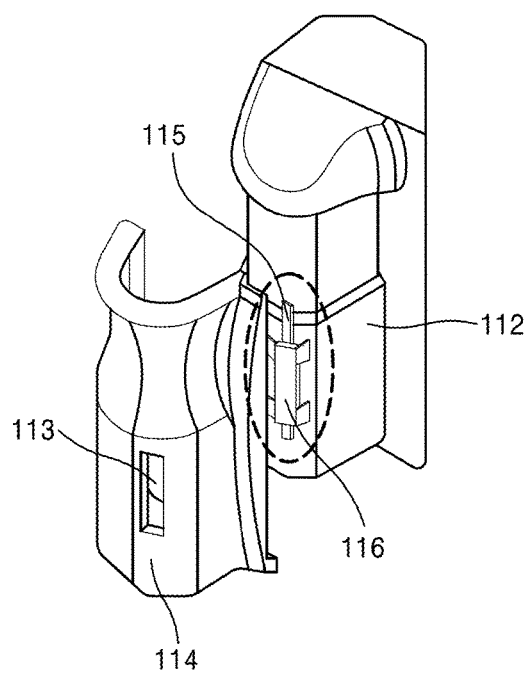
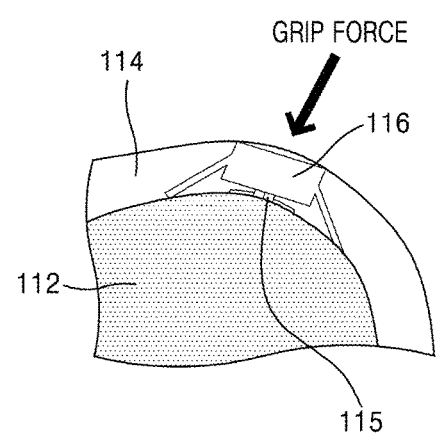

IMAGING DEVICE AND METHOD OF OPERATING THE SAME

CROSS-REFERENCE TO RELATED APPLICATION

This application is based on and claims priority under 35 U.S.C. § 119 to Korean Patent Application No. 10-2015-0097865, filed on Jul. 9, 2015, in the Korean Intellectual Property Office, the disclosure of which is incorporated by reference herein in its entirety.

BACKGROUND

1. Field

The disclosure relates to an imaging device and a method of operating the same, and for example, to an imaging device configured to control an operation based on a force with which a user grips the imaging device and a method of operating the same.

2. Description of Related Art

When no input is received for a constant time or more while power of an imaging device is turned on, the imaging device enters a sleep mode. The sleep mode refers to a mode in which functions other than minimum functions are stopped in order to save power of the imaging device. When a user recognizes a subject to be imaged and attempts to image the subject in a sleep mode state, the imaging device performs booting in order to prepare imaging. In this case, since a certain time is required to perform booting, if booting starts when imaging is attempted, no subject may be imaged at a time at which the user intends to perform imaging.

SUMMARY

Various examples may provide an imaging device capable of detecting a force with which a user grips the imaging device in a sleep mode or a booting ready mode of the imaging device and performing switching to an imaging ready mode quickly and accurately, and a method of operating the same.

According to an aspect of an example embodiment, an imaging device is provided, including: a detection unit (e.g., detection circuitry) configured to detect a grip force; and a control unit (e.g., a controller) configured to set a reference force based on at least one of weight information of a lens mounted on the imaging device and base grip force information and to operate in an imaging ready mode when the detected grip force is greater than or equal to the reference force.

The imaging device may further include an interface configured to receive the weight information of the lens from the lens mounted on the imaging device, and to transmit the received weight information of the lens to the controller.

The controller may be configured to set a first force as the reference force when a weight of the lens is less than a first value and to set a second force greater than the first force as the reference force when the weight of the lens is greater than or equal the first value, based on the weight information of the lens.

The detection circuitry may be configured to detect the base grip force while the imaging device is operated in a sleep mode, and the controller may be configured to set the reference force based on the detected base grip force.

The controller may include a first controller and a second controller. In the imaging ready mode, the second controller may be configured to transmit a booting signal to the first controller, and the first controller that has received the booting signal may be configured to wake up an image signal processor and to turn a viewfinder on.

The imaging device may further include an eyepiece sensor configured to generate an eyepiece signal when an eye is within a predetermined proximity a viewfinder; and an input configured to receive an input. The controller may be configured to maintain the imaging ready mode when the eyepiece signal is detected or an input is received in the imaging ready mode.

The controller may be configured to control an imaging sensor and image a subject when an imaging request signal is received in the imaging ready mode.

The imaging device may further include an eyepiece sensor configured to generate an eyepiece signal when an eye is within a predetermined proximity of a viewfinder; and an input unit configured to receive an input. The control unit may be configured to operate in a booting ready mode when no eyepiece signal is detected and no input is received for a preset first time in the imaging ready mode.

The controller may be configured to operate in a sleep mode when no eyepiece signal is detected and no input is received for a preset second time in the booting ready mode.

The first controller and the second controller may be configured to not operate in the sleep mode, and the first controller may be configured to not operate and the second controller may be configured to operate in a low power mode in the booting ready mode.

The controller may be configured to be switched to the booting ready mode from the sleep mode when a grip force is detected in the sleep mode.

According to an aspect of another example embodiment, a method of operating an imaging device is provided, including setting a reference force based on at least one of weight information of a lens mounted on the imaging device and base grip force information; detecting a grip force; and operating in an imaging ready mode when the detected grip force is greater than or equal to the reference force.

The method may further include receiving weight information of the lens from the lens mounted on the imaging device. The setting of the reference force may include setting the reference force based on the received weight information of the lens.

The setting of the reference force may include setting a first force as the reference force when a weight of the lens is less than a first value and setting a second force greater than the first force as the reference force when the weight of the lens is greater than or equal to the first value, based on the weight information of the lens.

The method may further include detecting the base grip force while the imaging device is operated in a sleep mode. The setting of the reference force may include setting the reference force based on the detected base grip force.

The operating in the imaging ready mode may include: transmitting, by a second controller, a booting signal to a first controller; and waking up an image signal processor and turning a viewfinder on by the first controller that has received the booting signal.

The method may further include detecting an eyepiece signal generated when an eye is within a predetermined proximity of a viewfinder or receiving an input. The operating in the imaging ready mode may include maintaining the imaging ready mode when the eyepiece signal is detected or the input is received in the imaging ready mode.

The method may further include receiving an imaging request signal in the imaging ready mode; and controlling an imaging sensor included in the imaging device and imaging a subject.

The method may further include operating in a booting ready mode if an eyepiece signal generated when the eye is within a predetermined proximity of a viewfinder is not detected for a preset first time and an input is not received for the first time in the imaging ready mode.

The method may further include operating in a sleep mode when the eyepiece signal is not detected for a preset second time and the input is not received for the second time in the booting ready mode.

The method may further include disabling operations of a first controller and a second controller in the sleep mode, and disabling the operation of the first controller and operating the second controller in a low power mode in the booting ready mode.

The method may further include switching to the booting ready mode from the sleep mode when a grip force is detected in the sleep mode.

According to an aspect of still another example embodiment, a method of operating an imaging device is provided, including: setting a reference force based on at least one of weight information of a lens mounted on the imaging device and base grip force information; operating in a continuous imaging mode; detecting a grip force; and changing a rate of the continuous imaging when the detected grip force is greater than or equal to the reference force.

According to an aspect of yet another example embodiment, a method of operating an imaging device is provided, including: setting a reference force based on at least one of weight information of a lens mounted on the imaging device and base grip force information; operating in a video imaging mode; detecting a grip force; and operating in a still image capturing mode when the detected grip force is greater than or equal to the reference force.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 2A is a diagram illustrating an example structure of a grip portion 110 of FIG. 1, and FIG. 2B is a diagram illustrating a cross section when the example grip portion 110 of FIG. 2A is cut horizontally;

DETAILED DESCRIPTION

Figure 1:
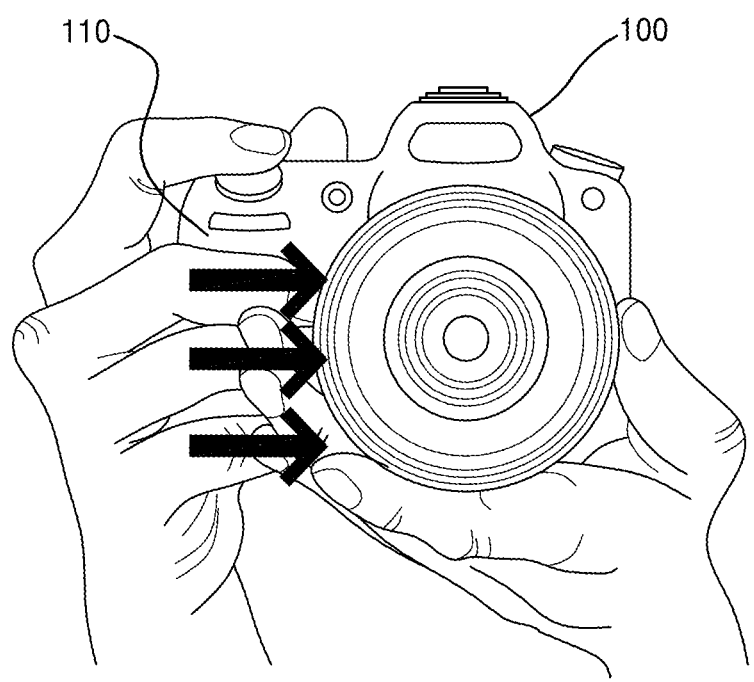
FIG. 1 is a diagram illustrating an example posture of a user when a subject is captured using an imaging device.

The terms used herein will be briefly described and examples of the disclosure will be described in greater detail.

Although the terms used herein are selected from among general terms that are currently and widely used in consideration of functions in examples of the disclosure, these may be changed according to intentions of those skilled in the art, precedents, or the advent of new technology. In addition, in example instances, some terms may be arbitrary selected by applicants. For example, meanings thereof will be described in detail in a corresponding description of examples of the disclosure. Therefore, the terms used herein should be defined based on meanings of the terms and content of this disclosure, rather than simply the terms themselves.

Throughout the disclosure, when a portion "includes" an element, another element may be further included, rather than excluding the existence of the other element, unless otherwise described. Moreover, terms described in the disclosure such as " . . . part," and "module," refer to a unit of processing at least one function or operation, and may be implemented by hardware (e.g., circuitry) or software or a combination thereof.

Hereinafter, examples will be described in greater detail with reference to the accompanying drawings. However, examples of the disclosure may be implemented in several different forms, and are not limited to examples described herein. In addition, parts irrelevant to description may be omitted in the drawings in order to clearly explain examples of the disclosure. Similar parts are denoted by similar reference numerals throughout this disclosure.

FIG. 1 is a diagram illustrating an example posture of a user when a subject is captured using an example imaging device.

As illustrated in FIG. 1, an imaging device 100 may be a camera. For example, the camera may be implemented in various forms such as a digital still camera configured to capture a still image or a digital video camera configured to capture a video, etc. Also, a digital single-lens reflex (DSLR) camera, a mirror-less camera or a smartphone may be included, for example. However, the imaging device 100 is not limited thereto, and the imaging device 100 may include a device having a camera module that may include a lens and an imaging element, capture the subject, and generate an image.

When the imaging device 100 is used to capture the subject, the user grips a grip portion 110 with his or her hand in order to raise the imaging device 100. Therefore, a force is applied to the grip portion 110. The example imaging device 100 may detect a grip force detected in the grip portion 110 and control an operation of the imaging device 100 based on the detected force.

For example, when the grip force is detected in the grip portion 110 in a booting ready mode and it is determined that the detected grip force is equal to or greater than a reference force, the imaging device 100 may, for example, be operated in an imaging ready mode. Also, when the grip force is detected in the grip portion 110 in a sleep mode, the imaging device 100 may, for example, be operated in the booting ready mode or the imaging ready mode.

The reference force may, for example, be set based on at least one of weight information of a lens mounted on the imaging device 100 and base grip force information based on the grip of the user. For example, as a weight of the lens mounted on the imaging device 100 increases, the reference force may be set to a greater value. Also, the imaging device 100 may measure a force (base grip force) with which the user grips the imaging device 100 while the imaging device is not being operated (for example, in the sleep mode), and set the reference force based on the measured base grip force.

FIG. 2A is a diagram illustrating an example structure of an example grip portion 110 of FIG. 1, and FIG. 2B is a diagram illustrating a cross section when the example grip portion 110 of FIG. 2A is cut horizontally.

As illustrated in FIGS. 2A and 2B, the grip portion 110 may, for example, include a force sensor 115 configured to detect a force with which the imaging device 100 is gripped. The force sensor 115 may, for example, be mounted on a main body 112 of the imaging device 100 and may, for example, include a piezoelectric element such as a PZT or a force sensing resistor (FSR), or the like. A hole 113 may be formed in a mold 114 surrounding the main body 112, and the main body 112 and the mold 114 may be combined such that a part on which the force sensor 115 is mounted is positioned in the hole 113. Therefore, without interference due to the mold 114, the grip force may be delivered to the force sensor 115. For example, in order to smoothly deliver the grip force to the force sensor 115, a spring structure 116 may be further provided between the force sensor 115 and a point at which the grip force is generated.

The spring structure 116 may suppress a force such as a disturbance from being delivered, and prevent and/or reduce the possibility of a malfunction of force sensing such that the force sensor 115 detects a force only when a force of a specific value or more is applied to the spring structure 116.

The spring structure 116 may, for example, be made of a polyurethane foam material. The polyurethane foam has a characteristic in which it is compressed and then slowly restored to an original state. Although not illustrated, a structure in point contact with the spring structure 116 may be further included. When a size of the structure is regulated, sensitivity of grip force delivery may be regulated.

Although not illustrated, the grip portion 110 may further include a cover covering the mold 114 and the spring structure 116.

The described structure of the grip portion 110 illustrated in FIGS. 2A and 2B is only an example, and the structure is not limited thereto. The grip portion 110 may have various structures.

Figure 3:
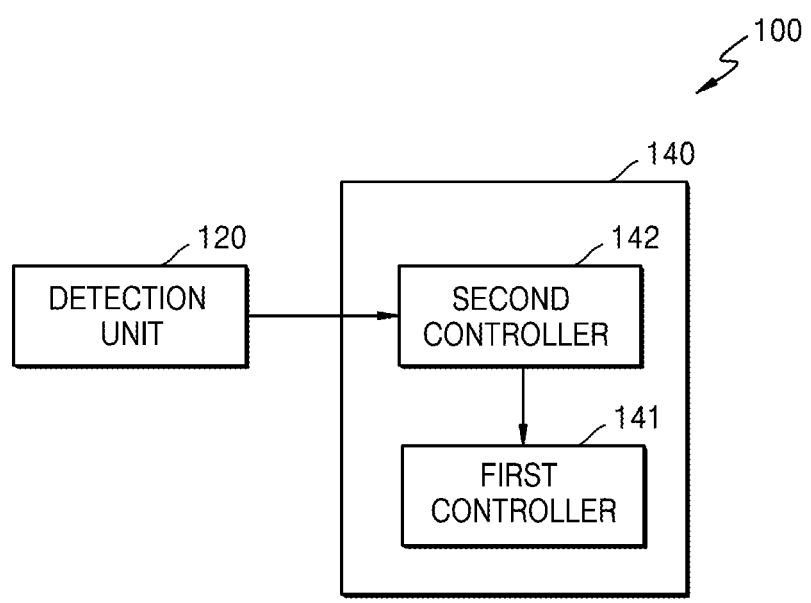
FIG. 3 is a block diagram illustrating an example configuration of an example imaging device.

FIG. 3 is a block diagram illustrating an example configuration of an example imaging device.

The imaging device 100 according to the example may include a detection unit 120 and a control unit 140.

The detection unit 120 includes detection circuitry that may detect the grip force with which the user grips the imaging device 100. For example, the detection unit 120 may include at least one force sensor configured to detect a force. The force sensor may be mounted on the grip portion 110 of the imaging device 100, and may, for example, include a piezoelectric element such as a PZT or a force sensing resistor (FSR).

The control unit 140 may include a first control unit (e.g., controller) 141 and a second control unit (e.g., controller) 142. The first control unit 141, which may, for example, be a main controller of the imaging device 100, may generally be configured to control operations of components included in the imaging device 100. For example, the first controller 141 may be configured to provide a control signal to an aperture driving unit, a lens driving unit, an imaging sensor control unit, an image signal processing unit and the like in order to capture the subject and obtain an image. When no imaging operation is performed for a preset time, the first controller 141 may be switched to a sleep state in order to save power.

The second controller 142 may, for example, be configured to serve as a sub-control unit of the imaging device 100. The second controller 142 may be configured to obtain weight information of the lens mounted on the imaging device 100 and to set a magnitude of the reference force based on a weight of the lens. For example, as a weight of the lens increases, a magnitude of the reference force may be set to be greater. Also, the second controller 142 may be configured to obtain base grip force information and to set a magnitude of a reference voltage based on the magnitude of the base grip force. For example, as a magnitude of the base grip force increases, a magnitude of the reference force may be set to be greater.

Also, the second controller 142 may be configured to have lower power consumption than the first controller 141, and to compare the detected grip force with the reference force. When the detected grip force is equal to or greater than the reference force, the second controller 142 may be configured to transmit a booting signal to the first controller 141 and to wake up the first controller 141 from the sleep state.

Figure 4:
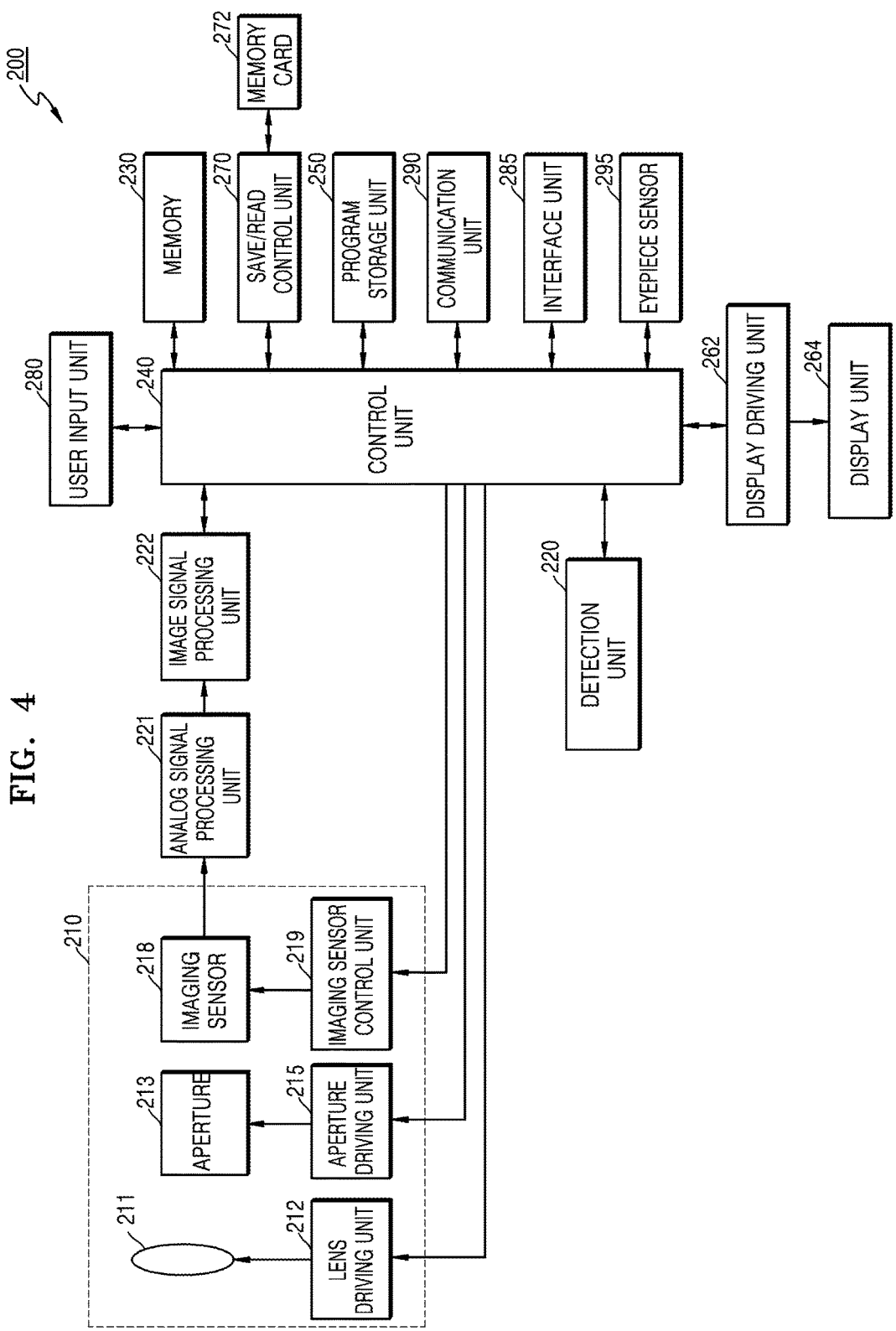
FIG. 4 is a block diagram illustrating an example configuration of an example imaging device.

FIG. 4 is a block diagram illustrating an example configuration of an example imaging device.

As illustrated in FIG. 4, an imaging device 200 may include an imaging unit 210, an image signal processing unit (e.g., image processor) 222, an analog signal processing unit (e.g., analog signal processor) 221, a detection unit 220, a memory 230, a save/read control unit 270, a memory card 272, a program storage unit 250, a display driving unit 262, a display unit 264, a control unit 240, a user input unit 280, an interface unit 285, an eyepiece sensor 295 and a communication unit 290.

Since the detection unit 220 and the control unit 240 of FIG. 4 correspond to the detection unit 120 and the control unit 140 of FIG. 3, respectively, redundant descriptions thereof will be omitted, and the other components will be described.

Overall operations of the imaging device 200 may be controlled by the control unit 240 and the controllers within the control unit 240. The control unit 240 provides a control signal for operating, for example, each component including a lens driving unit 212, an aperture driving unit 215, an imaging sensor control unit 219 and the like.

The imaging unit 210 is a component configured to convert incident light into an electrical signal and generate an image using the converted electrical signal, and includes a lens 211, the lens driving unit 212, an aperture 213, the aperture driving unit 215, an imaging sensor 218, and the imaging sensor control unit 219.

The lens 211 may, for example, include a plurality of groups of lenses or a plurality of lenses. The lens 211 has a position that is regulated by the lens driving unit 212. Based on the control signal provided from the control unit 240, the lens driving unit 212 regulates the position of the lens 211.

The lens driving unit 212 may, for example, regulate the position of the lens, regulate a focal length, and perform operations of autofocusing, zoom changing, and focus changing.

The aperture 213 has an opening degree that is regulated by the aperture driving unit 215, and regulates an amount of light incident on the imaging sensor 218.

An optical signal that passed through the lens 211 and the aperture 213 forms an image of the subject on a light-receiving surface of the imaging sensor 218. The imaging sensor 218 may, for example, be a charge coupled device (CCD) image sensor configured to convert an optical signal into an electrical signal or a complementary metal oxide semiconductor image sensor (CIS), or the like. The imaging sensor 218 has sensitivity or the like that may be regulated by the imaging sensor control unit 219. The imaging sensor control unit 219 may control the imaging sensor 218 based on a control signal that may be automatically generated by an image signal input in real time or a control signal that is manually input.

The analog signal processing unit (e.g., a processor) 221 may, for example, be configured to perform noise reduction processing, gain adjustment, waveform shaping, analog-to-digital conversion processing and the like on an analog signal supplied from the imaging sensor 218.

The image signal processing unit (e.g., a processor) 222 may, for example, be a signal processor configured to perform a specific function on an image data signal that is processed in the analog signal processing unit 221. For example, image signal processing for providing a special effect and image quality improvement such as noise reduction, gamma correction, color filter array interpolation, a color matrix, color correction, color enhancement white balance regulation, brightness smoothing and color shading, or the like, may be performed on input image data. The image signal processing unit 222 may be configured to compress the input image data to generate an image file, or to restore image data from the image file. A compression type of the image may, for example, be a reversible type or an irreversible type. As an example of an appropriate type, a still image may be converted into a joint photographic experts group (JPEG) type, a JPEG 2000 type or the like. Also, when a video is recorded, a plurality of frames may be compressed to generate a video file according to a moving picture experts group (MPEG) standard. The image file may be generated according to, for example, an exchangeable image file format (Exif) standard.

The image signal processing unit 222 may be configured to generate a video file from an imaging signal generated in the imaging sensor 218. The imaging signal may be a signal that is generated in the imaging sensor 218 and processed by the analog signal processing unit 221. The image signal processing unit 222 may be configured to generate frames to be included in the video file from the imaging signal, encode the frames according to a standard, for example, moving picture experts group 4 (MPEG4), H.264/AVC, or windows media video (WMV), compress the video, and then to generate the video file using the compressed video. The video file may, for example, be generated in various types such as mpg, mp4, 3gpp, avi, asf, or mov.

The image data output from the image signal processing unit 222 may be input to the save/read control unit 270 through the memory 230 or directly. The save/read control unit (e.g., a controller) 270 may be configured to store the image data in the memory card 272 based on a signal received from the user or automatically. Also, the save/read control unit 270 may be configured to read data about an image from the image file stored in the memory card 272, to input the data to the display driving unit through the memory 230 or another route, and to enable the image to be displayed on the display unit 264. The memory card 272 may be detachable or permanently mounted on the imaging device 200. For example, the memory card 272 may be a flash memory card such as a secure digital (SD) card.

The image signal processing unit 222 may be configured to perform unsharpness processing, color processing, blur processing, edge enhancement processing, image analyzing processing, image recognition processing, image effect processing or the like on the input image data. Image recognition processing, face recognition, scene recognition processing or the like may also be performed. In addition, the image signal processing unit 222 may be configured to perform display image signal processing for performing displaying on the display unit 264. For example, brightness level adjustment, color correction, contrast adjustment, edge enhancement adjustment, screen split processing, generation of a character image or the like, a synthesizing process of an image or the like may be performed.

The signal that has been processed by the image signal processing unit 222 may be input to the control unit 240 through the memory 230 or input to the control unit 240 without passing through the memory 230. For example, the memory 230 may serve as a main memory of the imaging device 200 and temporarily stores information necessary when the image signal processing unit 222 or the control unit 240 is operated. The program storage unit 250 may store a program such as an application system or an operating system driving the imaging device 200.

The imaging device 200 includes the display unit (e.g., including a display) 264 configured to display an operation state thereof or image information captured by the imaging device 200. The display unit 264 may be configured to provide visual information for the user. In order to provide the visual information, the display unit 264 may include, for example, a liquid crystal display panel (LCD) or an organic light emitting display panel, or the like. Also, the display unit 264 may, for example, be a touch screen capable of recognizing a touch input.

The display driving unit 262 provides a driving signal to the display unit 264.

The control unit 240 may be configured to process the input image signal, and to control components accordingly or based on an external input signal. The control unit 240 may correspond to one or a plurality of processors. The processor may be implemented in an array of several logic gates or may be implemented in a combination of a general microprocessor and a memory in which a program that can be executed in the microprocessor is stored. Also, those skilled in the art may understand that the processor may be implemented in other hardware types.

The control unit 240 may be configured to generate a control signal for controlling autofocusing, zoom changing, focus changing, auto exposure correction or the like by executing a program stored in the program storage unit 250 or through a separate module, to provide the signal to the aperture driving unit 215, the lens driving unit 212, and the imaging sensor control unit 219, and to generally control operations of components of the imaging device 200 such as a shutter and a strobe.

Also, the control unit 240 may be connected to an external monitor, and may be configured to perform predetermined image signal processing on the image signal input from the image signal processing unit 222 such that the result is displayed on the external monitor, to transmit the image data processed in this manner, and to enable the image to be displayed on the external monitor.

The user input unit 280 is a unit configured such that the user is able to input a control signal. The user input unit 280 may, for example, include various function buttons such as a shutter-release button configured to input a shutter-release signal causing the imaging sensor 218 to be exposed to light for a determined time to capture a picture, a power button configured to input a control signal for controlling power on or off, a zoom button configured to increase or decrease an angle of view according to an input, a mode selecting button, and other imaging setting value control buttons. The user input unit 280 may be implemented in any form through which the user is able to input a control signal such as a button, a keyboard, a touch pad, a touch screen, or a remote controller.

The interface unit 285 may transmit or receive data to or from an external device connected to the imaging device 200. The interface unit 285 according to the example may receive weight information of the lens from the lens mounted on the imaging device 200.

The eyepiece sensor 295 may be disposed near a viewfinder of the imaging device 200. The eyepiece sensor 295 may detect approaching or proximity of the user or the user's eye and generate an eyepiece signal.

The communication unit (e.g., communication circuitry) 290 may include a network interface card (NIC) or a modem and enable the imaging device 200 to communicate with the external device via a network in a wireless and wired manner. The communication unit 290 according to the example may receive weight information of the lens from the lens mounted on the imaging device 100.

Figure 5A:
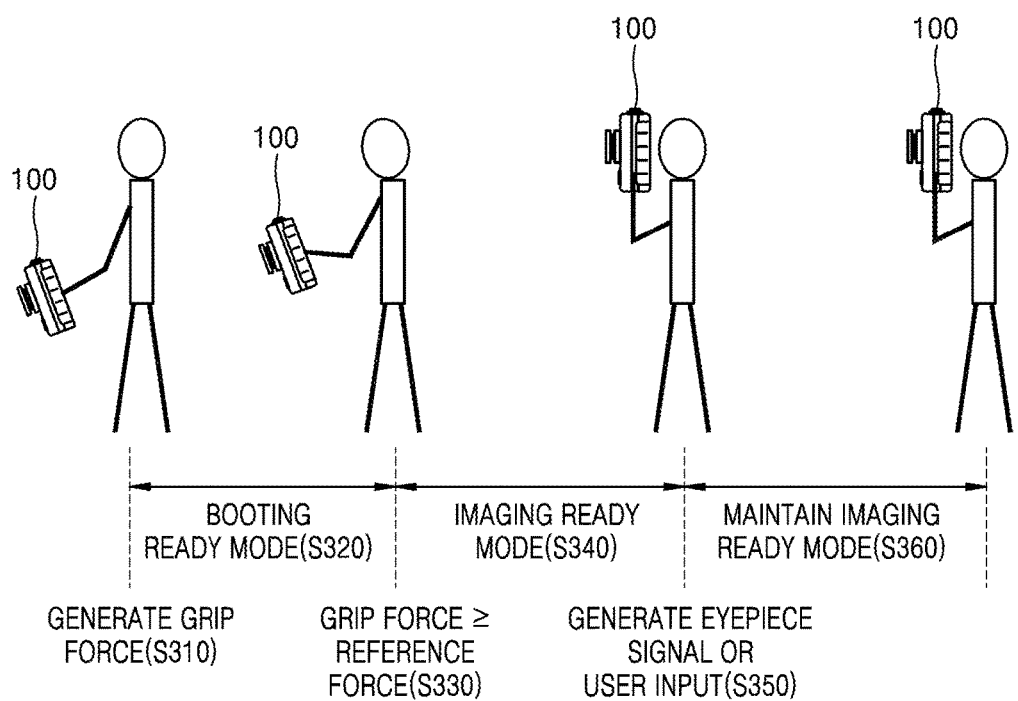
FIGS. 5A and 5B are diagrams illustrating example operation modes of an imaging device.
Figure 5B:
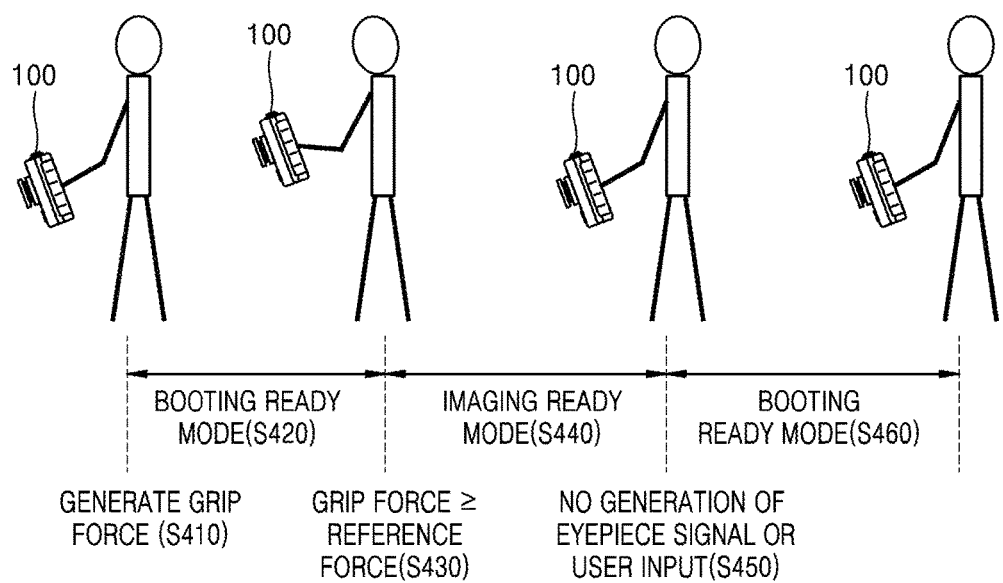

FIGS. 5A and 5B are diagrams illustrating example operation modes of an imaging device.

As illustrated in FIG. 5A, when the user grips the imaging device 100, a grip force may be generated in the grip portion of the imaging device 100 (S310). The imaging device 100 may detect the grip force generated in the grip portion. When the grip force is detected in the sleep mode, the imaging device 100 may be operated in the booting ready mode (S320).

The sleep mode refers, for example, to a sleep state in which neither the first controller 141 nor the second controller 142 included in the control unit 140 of the imaging device 100 is operated. When no imaging operation is performed for a preset time in the imaging device 100, the first controller 141 and the second controller 142 may be switched to the sleep state. The second controller 142 may be configured to detect whether a grip force is generated in the sleep mode. When the grip force is generated, the second controller 142 may be configured to operate in the booting ready mode.

In the booting ready mode, the first controller 141 is in the sleep state and the second controller 142 is in a state (ready state) operated in a low power mode. The second controller 142 may be configured to compare a magnitude of the grip force with a magnitude of the reference force in the booting ready mode.

For example, when it is determined that the grip force is equal to or greater than the reference force (S330), the imaging device 100 may be configured to be operated in the imaging ready mode (S340).

In the imaging ready mode, the second controller 142 may be configured to transmit a booting signal to the first controller 141 and to wake up the first controller 141 from the sleep state. The first controller 141 that has received the booting signal may be configured to turn an electronic viewfinder (EVF) on, to operate the aperture driving unit, the lens driving unit, the imaging sensor control unit and the like, and to complete preparation for imaging the subject.

The imaging device 100 may detect the eyepiece signal generated in the eyepiece sensor disposed near the viewfinder. For example, when the user's eye approaches near the viewfinder in order to check a viewfinder image, the eyepiece sensor may detect the approaching or proximity of the user or the user's eye and generate an eyepiece signal. In the imaging ready mode, when the eyepiece signal is detected, the imaging device 100 may continuously remain in the imaging ready mode (S360).

When a user input to perform imaging is received, the imaging device 100 may continuously remain in the imaging ready mode (S360). For example, when the user presses various function buttons such as the shutter-release button configured to capture a picture, the zoom button configured to increase or decrease an angle of view based on an input, the mode selecting button, or other imaging setting value control buttons, the imaging device 100 may continuously remain in the imaging ready mode. In addition to pressing various function buttons, the user input may include inputting a control signal using various types of input devices such as a keyboard, a touch pad, a touch screen, or a remote controller, or the like.

As illustrated in FIG. 5B, when the user grips the imaging device 100, a grip force may be generated in the grip portion of the imaging device 100 (S410). The imaging device 100 may detect the grip force generated in the grip portion. When the grip force is detected in the sleep mode, the imaging device 100 may be operated in the booting ready mode (S420).

The second controller 142 may be configured to compare a magnitude of the grip force with a magnitude of the reference force in the booting ready mode. For example, when it is determined that the grip force is equal to or greater than the reference force (S430), the imaging device 100 may be operated in the imaging ready mode (S440).

When no eyepiece signal is detected and no input is received for a preset first time in the imaging ready mode (S450), the imaging device 100 may be operated in the booting ready mode (S460).

Although not illustrated, in the booting ready mode, when no eyepiece signal is detected and no input is received for a preset second time, the imaging device 100 may be operated in the sleep mode.

Figure 6B:
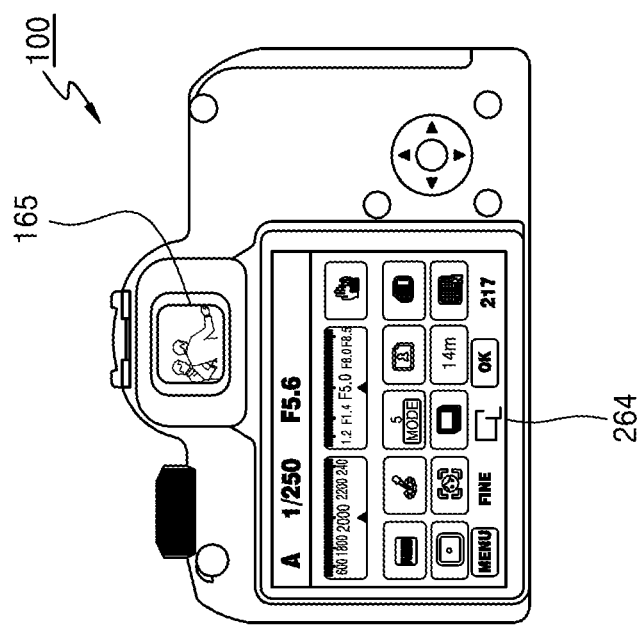
FIGS. 6A and 6B are diagrams illustrating an example imaging ready mode.
Figure 6A:
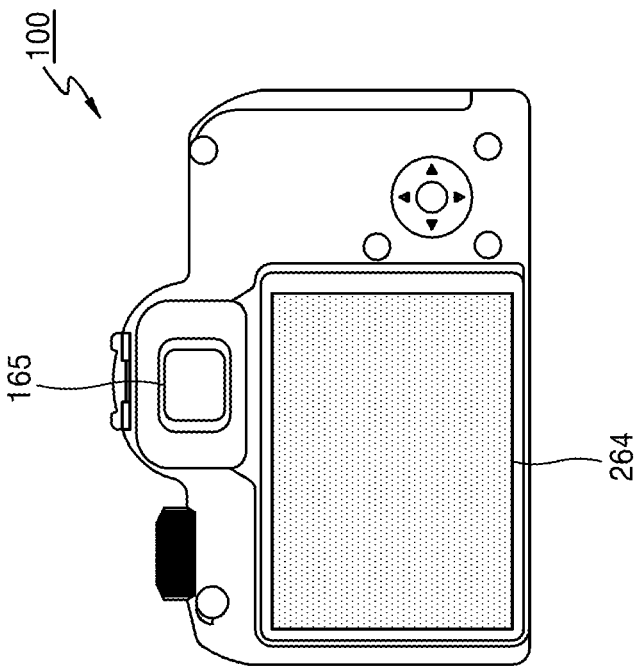

FIGS. 6A and 6B are diagrams illustrating an example imaging ready mode.

FIG. 6A is a diagram illustrating an example in which the imaging device 100 is operated in the sleep mode or the booting ready mode. As illustrated in FIG. 6A, when the imaging device 100 is operated in the sleep mode or the booting ready mode, an electronic viewfinder 165 and the display unit 264 may, for example, be turned off.

The electronic viewfinder 165 and the display unit 264 do not display the viewfinder image. The display unit 264 may be in an inactive state.

FIG. 6B is a diagram illustrating an example in which the imaging device 100 is operated in the imaging ready mode. As illustrated in FIG. 6B, when the imaging device 100 is operated in the imaging ready mode, the electronic viewfinder 165 or the display unit 264 may be turned on. The electronic viewfinder 165 may display the viewfinder image and the display unit 264 may display the captured image or information on imaging conditions. The user may check the viewfinder image through the electronic viewfinder 165, and check the captured image or information on imaging conditions through the display unit 264.

In addition, when the imaging device 100 according to the example is operated in the imaging ready mode, the image signal processor may be operated and preparation for imaging the subject may be completed.

Figure 7:
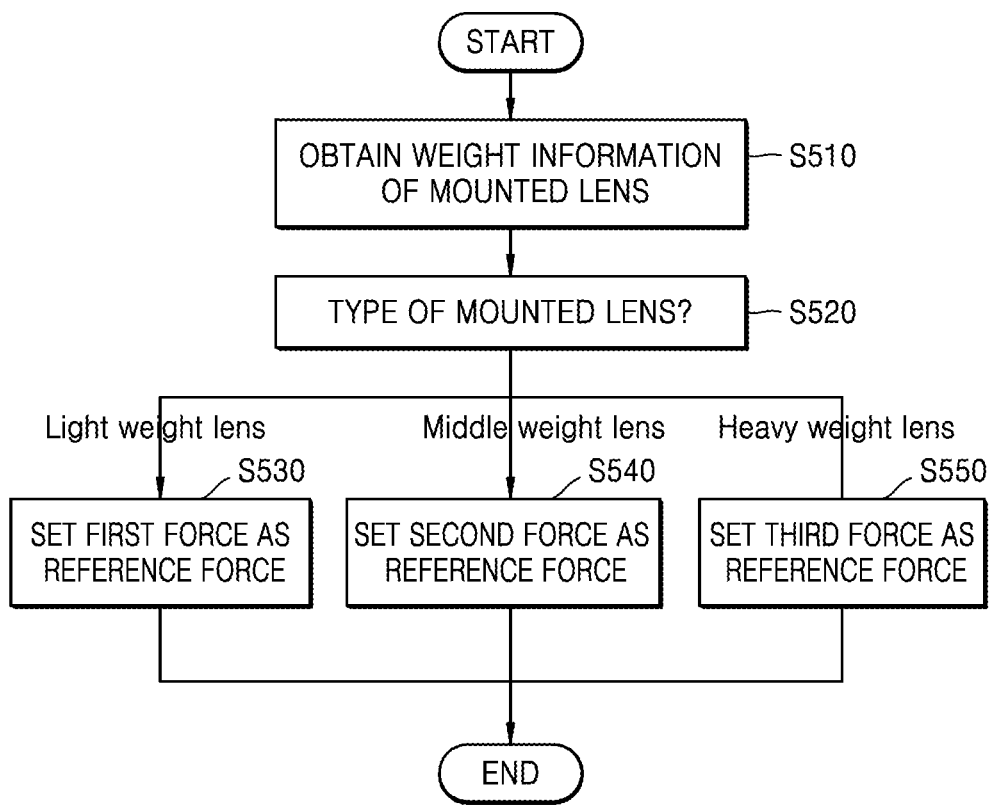
FIGS. 7 and 8 are diagrams illustrating an example method of setting a reference force based on weight information of a lens mounted on an imaging device.
Figure 8:
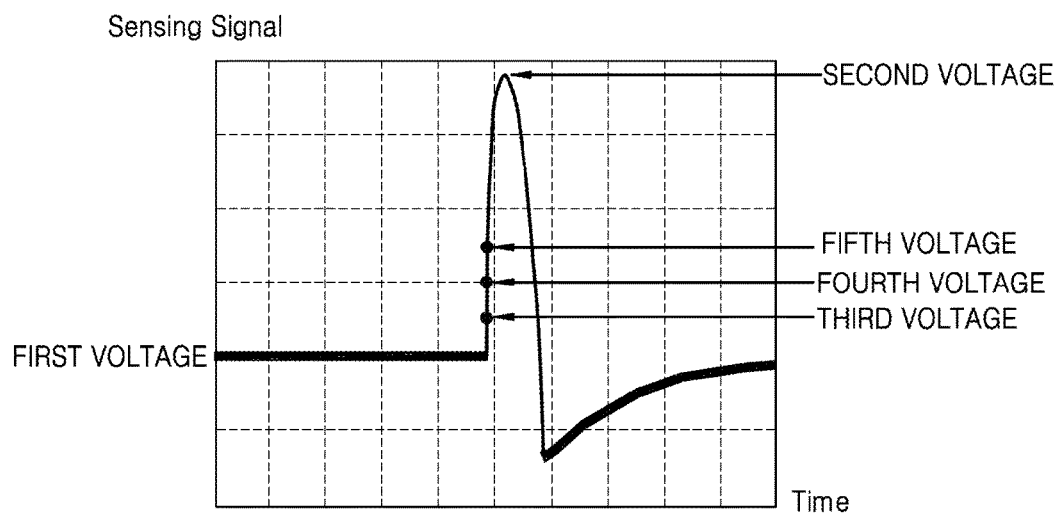

FIGS. 7 and 8 are diagrams illustrating an example method of setting a reference force based on weight information of a lens mounted on an imaging device.

As illustrated in FIG. 7, the imaging device 100 may obtain weight information of the lens mounted on the imaging device 100 (S510).

For example, the imaging device 100 may receive weight information of the lens mounted on the imaging device 100 through the interface unit. Weight information of the lens may be received through the communication unit. Weight information of the lens may be obtained based on user input.

The imaging device 100 may determine whether the lens mounted on the imaging device 100 is a light weight lens, a middle weight lens or a heavy weight lens based on the obtained weight information of the lens (S520).

For example, when the weight of the lens is less than a first value, the lens may be determined as the light weight lens. When the weight of the lens is equal to or greater than the first value and less than a second value greater than the first value, the lens may be determined as the middle weight lens. When the weight of the lens is equal to or greater than the second value, the lens may be determined as the heavy weight lens. However, examples of the disclosure are not limited thereto.

When the lens mounted on the imaging device 100 is a light weight lens, the imaging device 100 may set a first force as the reference force (S530). Similarly, when the lens mounted on the imaging device 100 is a middle weight lens, the imaging device 100 may set a second force as the reference force (S540), and when the lens mounted on the imaging device 100 is a heavy weight lens, the imaging device 100 may set a third force as the reference force (S550).

The force sensor configured to detect a force with which the user grips the imaging device 100 may generate a voltage (sensor signal) proportional to a strength of the detected force as illustrated in FIG. 8. For example, a first voltage may refer to a signal that is generated when the imaging device 100 is simply gripped. A second voltage may refer to a signal generated when the force sensor detects a maximum detectable force. For example, the second voltage may refer to a signal that is saturated with respect to a strength of the detected force. The imaging device 100 may, for example, set the reference force as a force corresponding to a voltage that is greater than the first voltage and less than the second voltage.

For example, when the lens mounted on the imaging device 100 is the light weight lens, the first force generating a third voltage that is greater than the first voltage and less than the second voltage may be set as the reference force.

Also, when the lens mounted on the imaging device 100 is the middle weight lens, the imaging device 100 may, for example, set a second force greater than the first force as the reference force. For example, a fourth voltage generated based on the second force may be greater than the third voltage. The fourth voltage may, for example, be a voltage that is greater than the first voltage and less than the second voltage.

When the lens mounted on the imaging device 100 is the heavy weight lens, the imaging device 100 may, for example, set a third force greater than the second force as the reference force. For example, a fifth voltage generated according to the third force is greater than the fourth voltage. Also, the fifth voltage may, for example, be a voltage that is greater than the first voltage and less than the second voltage.

The imaging device 100 according to the example may set the reference force as a greater value since a force with which the user grips the imaging device 100 increases in order to raise the imaging device 100 as the weight of the lens mounted on the imaging device 100 increases.

Figure 9:
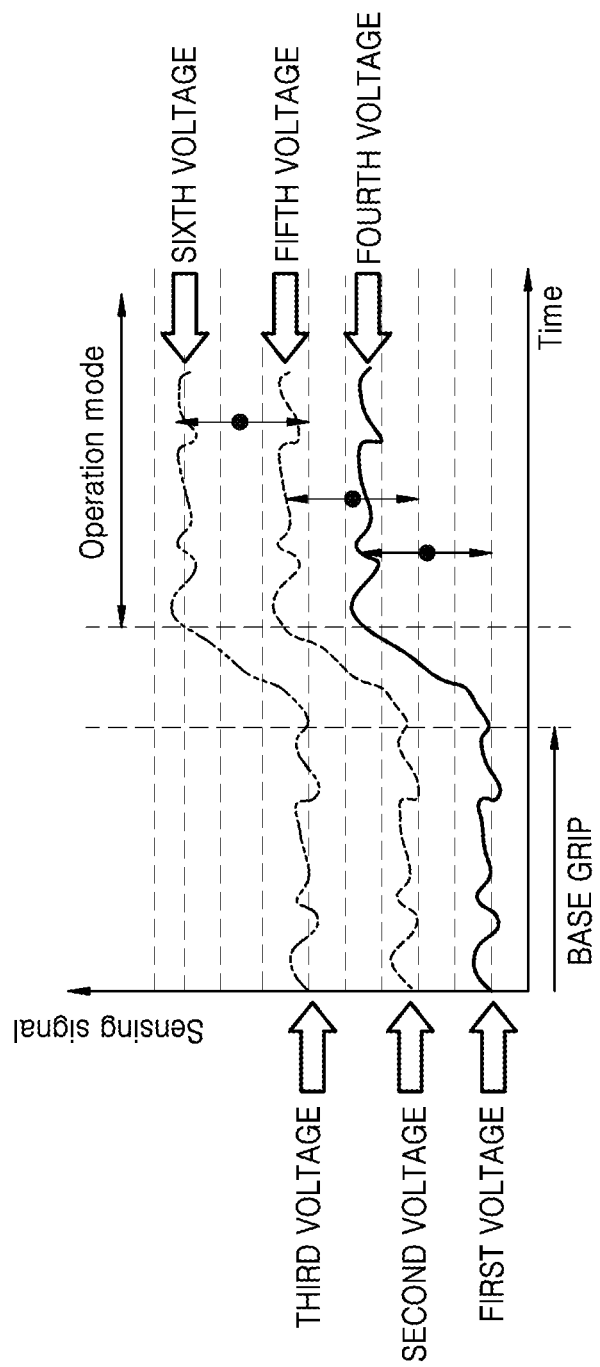
FIG. 9 is a diagram illustrating an example method of setting a reference force based on base grip force information of an example imaging device.

FIG. 9 is a diagram illustrating an example method of setting a reference force based on base grip force information of an imaging device.

As illustrated in FIG. 9, the imaging device 100 may measure the detected grip force while the imaging device 100 is operated in the sleep mode. The sleep mode refers to a state in which the first controller 141 and the second controller 142 are switched to the sleep state because no imaging operation is performed for a preset time in the imaging device 100, and may be, for example, a state in which the user simply grips the imaging device 100 and does not perform imaging.

In the sleep mode, the imaging device 100 may measure the grip force at regular intervals and determine an average value and a deviation of the measured grip forces. Also, the determined average value may be stored as the base grip force. However, examples of the disclosure are not limited thereto.

The imaging device 100 may store the base grip force for each user. For example, since a degree of the force with which the user grips the imaging device 100 may be different for each user, the base grip force may be different for each user.

The imaging device 100 may set the reference force based on the base grip force of the user. For example, the imaging device 100 may set a value that is greater than the base grip force by a preset value as the reference force.

As illustrated in FIG. 9, for example, when a base grip force of a first user is measured as the first force corresponding to the first voltage, the fourth force corresponding to the fourth voltage that is greater than the first voltage by a preset value may be set as the reference force for the first user.

When a base grip force of a second user is measured as the second force corresponding to the second voltage, a fifth force corresponding to the fifth voltage that is greater than the second voltage by a preset value may be set as the reference force for the second user.

When a base grip force of a third user is measured as a third force corresponding to the third voltage, a sixth force corresponding to a sixth voltage that is greater than the third voltage by a preset value may be set as the reference force for the third user.

Figure 10:
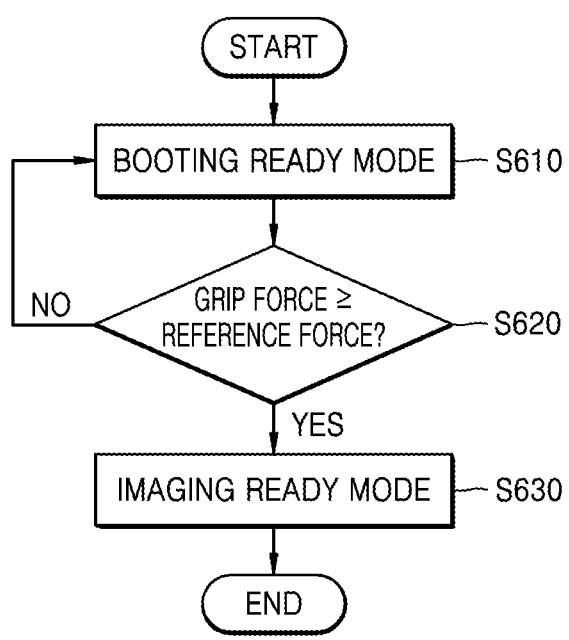
FIG. 10 is a flowchart illustrating an example method of operating an example imaging device.

FIG. 10 is a flowchart illustrating an example method of operating an example imaging device.

As illustrated in FIG. 10, the imaging device 100 may be operated in the booting ready mode (S610).

In the booting ready mode, the first controller 141 is in the sleep state and the second controller 142 is in a state (ready state) operated in a low power mode.

The imaging device 100 may detect a force with which the user grips the imaging device 100 and compare the detected force with the reference force. For example, the second controller may be configured to compare a magnitude of the grip force with which the user grips the imaging device with a magnitude of the reference force in the booting ready mode.

When the detected grip force is equal to or greater than the reference force (S620), the imaging device 100 may be operated in the imaging ready mode (S630).

In the imaging ready mode, the second controller may be configured to transmit a booting signal to the first controller and to wake up the first controller in the sleep state. The first controller that has received the booting signal may be configured to turn the electronic viewfinder (EVF) on, to operate the aperture driving unit, the lens driving unit, the imaging sensor control unit and the like, and to complete preparation for imaging the subject.

Figure 11:
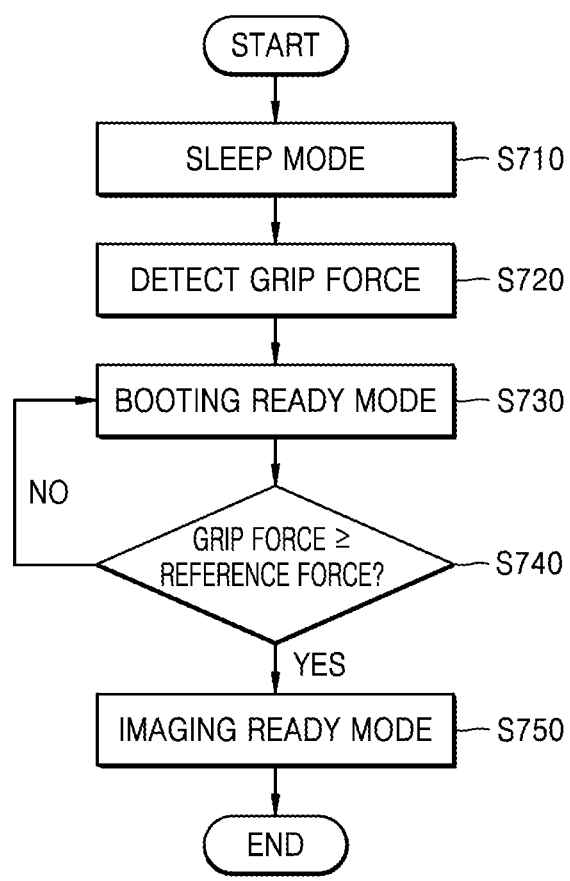
FIG. 11 is a flowchart illustrating an example method of operating an example imaging device.

FIG. 11 is a flowchart illustrating an example method of operating an example imaging device.

As illustrated in FIG. 11, the imaging device 100 may be operated in the sleep mode (S710).

The sleep mode may refer to a sleep state in which neither the first controller 141 nor the second controller 142 included in the imaging device 100 is operated. When no imaging operation is performed for a preset time in the imaging device 100, the first controller 141 and the second controller 142 may be switched to the sleep state.

The imaging device 100 may detect a force with which the user grips the imaging device 100 in the sleep mode (S720).

For example, the second control unit 142 may detect whether a grip force with which the user grips the imaging device is generated in the sleep mode.

When the grip force is detected, the imaging device 100 may be operated in the booting ready mode (S730).

As described in FIG. 10, in the booting ready mode, the first controller 141 is in the sleep state, and the second controller 142 is in a state (ready state) operated in a low power mode.

In the booting ready mode, the imaging device 100 may detect a force with which the user grips the imaging device 100, compare the detected force with the reference force, and when the detected grip force is equal to or greater than the reference force (S740), may be operated in the imaging ready mode (S750).

Since operations of S730 to S750 of FIG. 11 are similar to operations of S610 to S630 of FIG. 10, redundant descriptions thereof will be omitted.

When the grip force is detected in the sleep mode, the imaging device 100 according to the example may be switched to the imaging ready mode without switching to the booting ready mode. When the user grips the imaging device in the sleep mode, there is a high probability that he or she intends to perform imaging. Therefore, the imaging device 100 may, for example, be operated in the imaging ready mode without comparing the detected force with the reference force.

Figure 12:
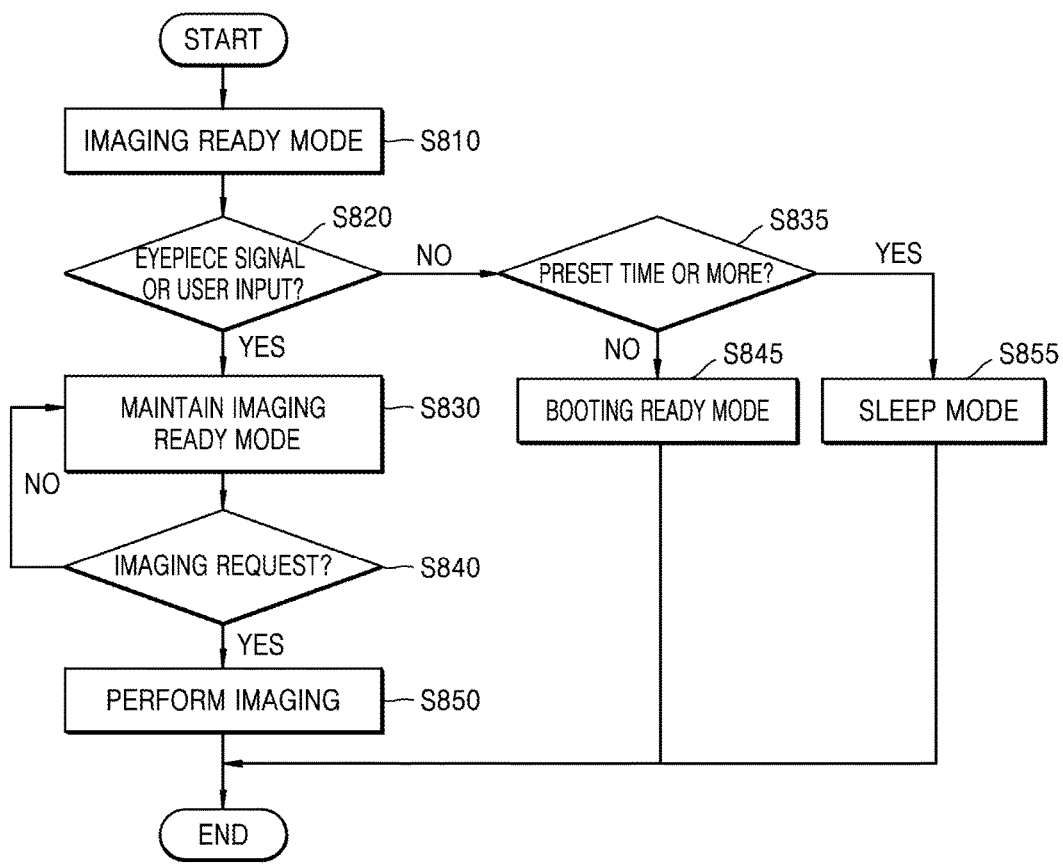
FIG. 12 is a flowchart illustrating an example method of operating an example imaging device.

FIG. 12 is a flowchart illustrating an example method of operating an example imaging device.

As illustrated in FIG. 12, the imaging device may be operated in the imaging ready mode (S810). For example, as described in FIGS. 10 and 11, when the detected grip force is equal to or greater than the reference force in the booting ready mode, the imaging device 100 may be operated in the imaging ready mode. Also, when the grip force is detected in the sleep mode, the imaging device 100 may be operated in the imaging ready mode.

In the imaging ready mode, the second controller 142 may be configured to transmit a booting signal to the first controller 141 and to wake up the first controller 141 in the sleep state. The first controller 141 that has received the booting signal may be configured to turn an electronic viewfinder (EVF) on, to operate the aperture driving unit, the lens driving unit, the imaging sensor control unit and the like, and to complete preparation for imaging the subject.

When the eyepiece signal is detected or the user input is received in the imaging ready mode (S820), the imaging device 100 may remain in the imaging ready mode (S830).

For example, the user may bring the viewfinder of the imaging device 100 near his or her eye in order to check the viewfinder image. For example, the eyepiece sensor disposed near the viewfinder may detect approaching or proximity of the user or the user's eye and generate the eyepiece signal. The imaging device 100 may detect the eyepiece signal.

When the user presses various function buttons such as the shutter-release button configured to capture a picture, the zoom button configured to increase or decrease an angle of view based on an input, the mode selecting button, or other imaging setting value control buttons, the imaging device 100 may remain in the imaging ready mode.

When an imaging request signal is input in the imaging ready mode (for example, when a shutter-release input enabling a picture to be captured is received) (S840), the imaging device 100 may expose the imaging sensor to light for a determined time, image the subject, process the imaged signal, and thus obtain an image (S850).

When no eyepiece signal is detected and no user input is received for a preset first time in the imaging ready mode, the imaging device 100 may be operated in the booting ready mode or the sleep mode.

For example, when no eyepiece signal is detected and no user input is received for a time shorter than the preset time, the imaging device 100 may be operated in the booting ready mode (S845). Also, when no eyepiece signal is detected and no user input is received for a time longer than the preset time, the imaging device 100 may be operated in the sleep mode (S855).

Figure 13A:
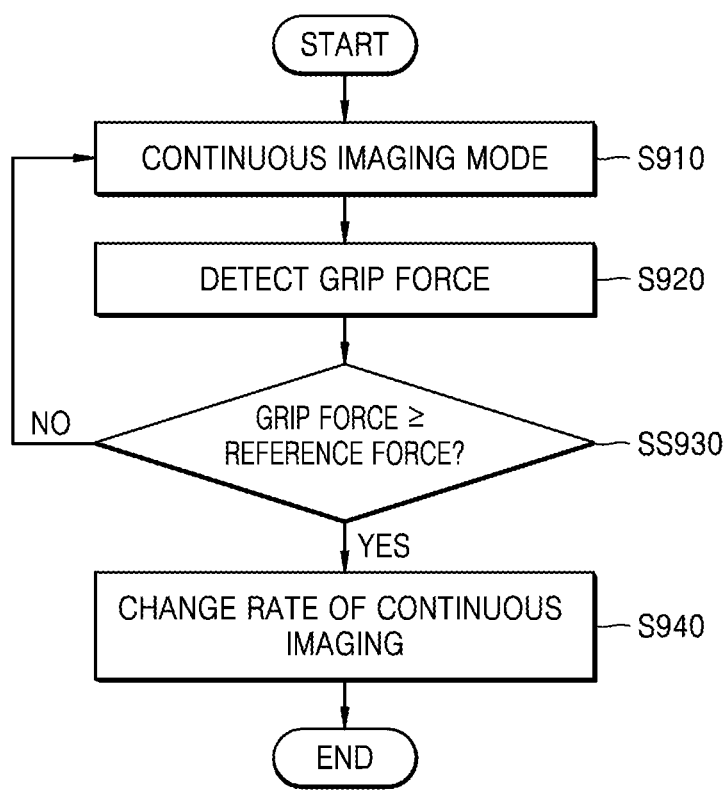
FIG. 13A is a flowchart illustrating an example method of operating an example imaging device.
Figure 13B:
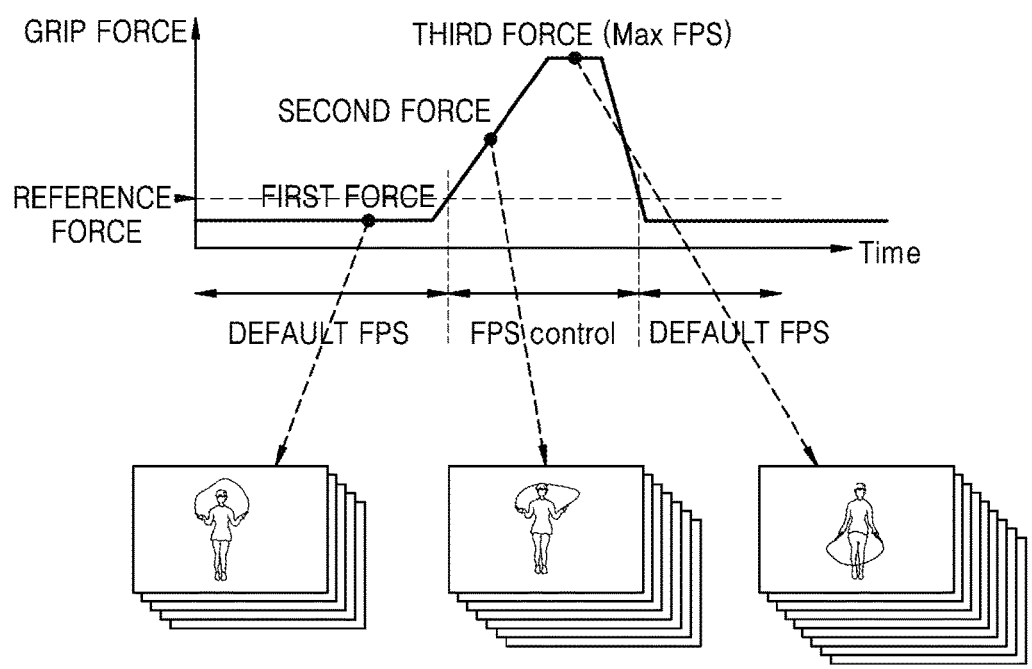
FIG. 13B is a diagram illustrating an example method of operating the example imaging device of FIG. 13A.

FIG. 13A is a flowchart illustrating an example method of operating an example imaging device, and FIG. 13B is a diagram illustrating an example method of operating the example imaging device of FIG. 13A.

As illustrated in FIG. 13A, the imaging device 100 may be operated in a continuous imaging mode (S910). The continuous imaging mode refers to a mode in which the subject is successively imaged. When the imaging device 100 is operated in the continuous imaging mode, the imaging device 100 may successively image the subject and obtain a preset number of image frames per second. Therefore, an imaging rate of continuous imaging may be indicated by frames per second (FPS).

The imaging device 100 may detect a force with which the user grips the imaging device 100 in the continuous imaging mode (S920).

The imaging device 100 determines whether the detected grip force is equal to or greater than the reference force (S930), and when the detected grip force is equal to or greater than the reference force, the imaging rate of continuous imaging may be changed (S940).

FIG. 13B illustrates casein example in which the imaging rate of continuous imaging is changed based on a magnitude of the grip force. As illustrated in FIG. 13B, the imaging device 100 may set a continuous imaging rate as a default set imaging rate when the detected grip force is less than the reference force.

For example, the imaging device 100 according to the example may set the default imaging rate to 5 fps in the continuous imaging mode. When the detected grip force is the first force and less than the reference force, the imaging device 100 may image the subject five times per second and obtain five image frames.

When the detected grip force is greater than the reference force, the imaging device 100 may increase the imaging rate of continuous imaging in proportion to a magnitude of the detected grip force.

For example, when the detected grip force is the second force and greater than the reference force, the imaging device 100 may image the subject seven times per second, and obtain seven image frames. When the detected grip force is the third force and the third force is greater than the reference force and the second force, the imaging device 100 may image the subject nine times per second and obtain nine image frames.

The force sensor configured to detect a force with which the user grips the imaging device 100 may have the third force that is a maximum detectable force. Therefore, even when the user grips the imaging device 100 with the fourth force greater than the third force, the imaging device 100 may perform operations based on the third force. Therefore, when the user grips the imaging device with a force equal to or greater than the third force, the grip force detected in the imaging device 100 is the third force, and the imaging device 100 may image the subject nine times per second and obtain nine image frames.

Figure 14A:
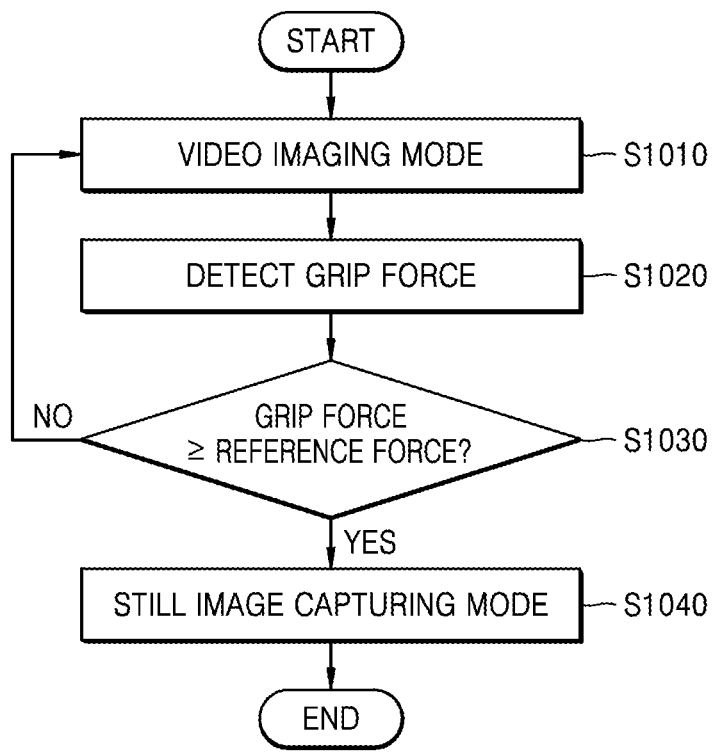
FIG. 14A is a flowchart illustrating an example method of operating an example imaging device.
Figure 14B:
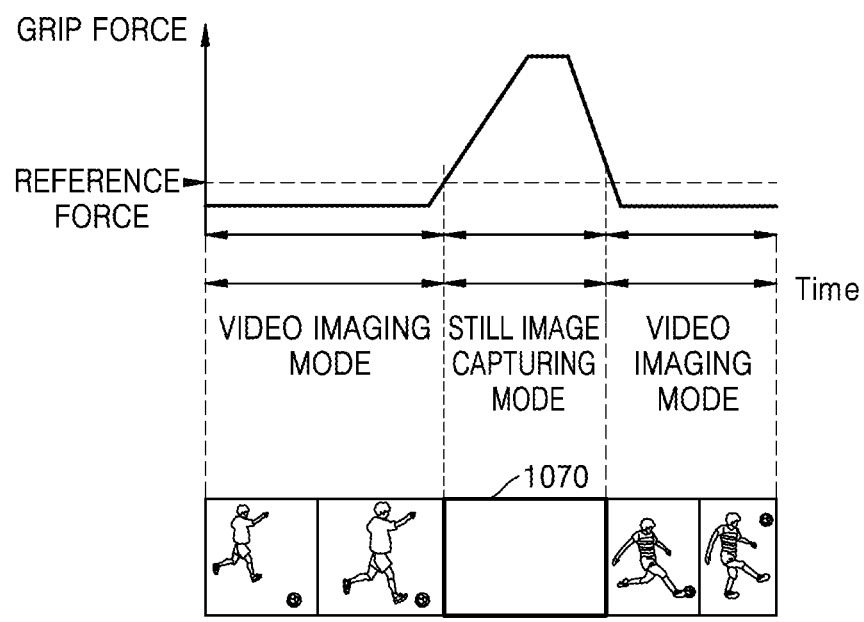
FIG. 14B is a diagram illustrating an example method of operating the example imaging device of FIG. 14A.

FIG. 14A is a flowchart illustrating an example method of operating an example imaging device, and FIG. 14B is a diagram illustrating an example method of operating the example imaging device of FIG. 14A.

As illustrated in FIG. 14A, the imaging device 100 may be operated in a video imaging mode (S1010).

In the video imaging mode, the imaging device 100 may generate successive frames from the imaging signal generated in the imaging sensor, use the generated frames, and generate a video file.

The imaging device 100 may detect a force with which the user grips the imaging device 100 in the continuous imaging mode (S1020).

The imaging device 100 determines whether the detected grip force is equal to or greater than the reference force (S1030), and when the detected grip force is equal to or greater than the reference force, the imaging device 100 may be operated in a still image capturing mode (S1040).

As illustrated in FIG. 14B, the imaging device 100 may expose the imaging sensor to light, image the subject, process the imaged signal, and thus obtain a still image 1060 only when an imaging request signal is input (for example, when a shutter-release input enabling a picture to be captured is received) in the still image capturing mode.

When the detected grip force is less than the reference force in the still image capturing mode, the imaging device 100 may be operated in the video imaging mode again. While the imaging device 100 is operated in the still image capturing mode, the imaging device 100 may not obtain video frames.

The imaging device 100 may scale the still image 1060 obtained in the still image capturing mode based on a resolution of other frames included in the video file, and insert the result into video frames 1070 in which a scaled still image is not obtained.

Figure 15A:
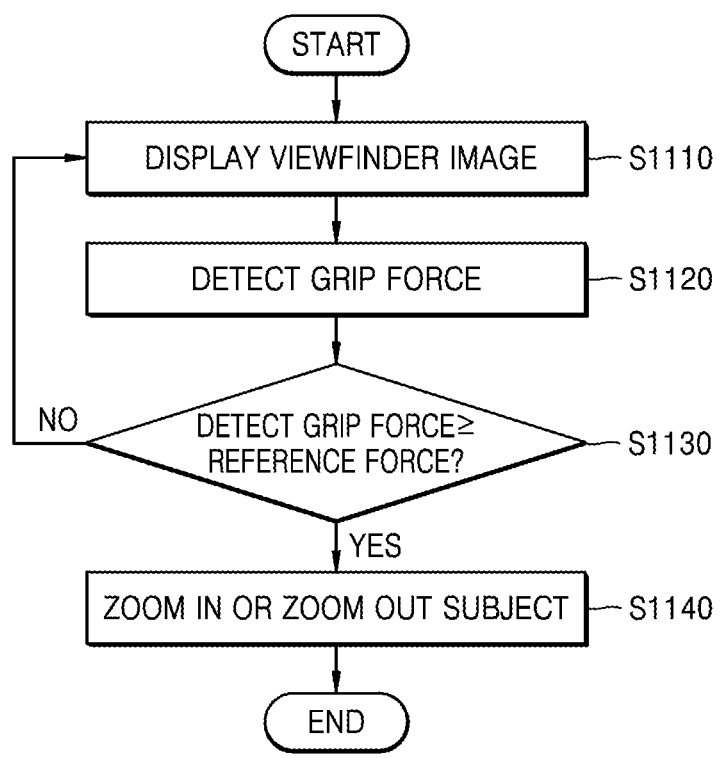
FIG. 15A is a flowchart illustrating an example method of operating an example imaging device.
Figure 15B:
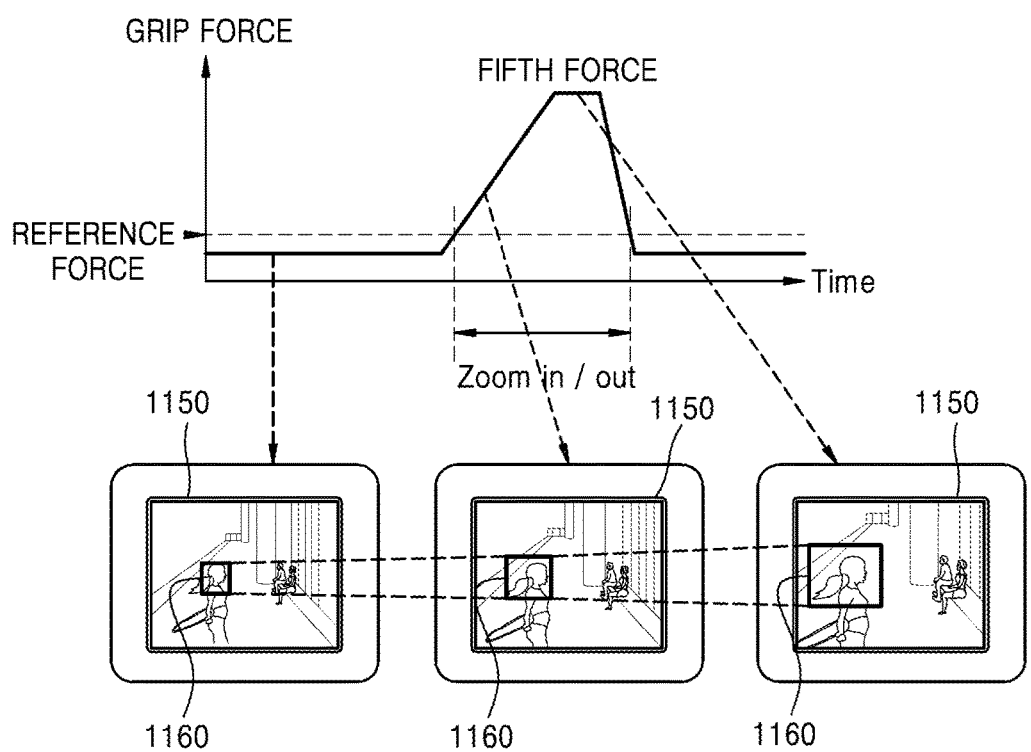
FIG. 15B is a diagram illustrating an example method of operating the example imaging device of FIG. 15A.

FIG. 15A is a flowchart illustrating an example method of operating an example imaging device, and FIG. 15B is a diagram illustrating an example method of operating the example imaging device of FIG. 15A.

As illustrated in FIG. 15A, the imaging device 100 may display the viewfinder image on the viewfinder (S1110).

For example, the imaging device 100 may display the viewfinder image in order for the user to check a composition of the subject to be imaged and imaging conditions.

The imaging device 100 may detect a force with which the user grips the imaging device 100 (S1120).

The imaging device 100 determines whether the detected grip force is equal to or greater than the reference force (S1130), and when the detected grip force is equal to or greater than the reference force, the imaging device 100 may be operated in a zoom regulating mode (S1140).

For example, as illustrated in FIG. 15B, the imaging device 100 may zoom in or zoom out a subject 1160 included in a viewfinder image 1150 in proportion to a magnitude of the detected grip force. As the detected grip force increases, for example, the subject included in the viewfinder image may be zoomed in. As the detected grip force decreases, the subject included in the viewfinder image may be zoomed out. When the subject included in the viewfinder image is zoomed in, a size of the subject 1160 increases. When the subject 1160 included in the viewfinder image 1150 is zoomed out, a size of the subject 1160 decreases.

For example, the imaging device 100 provides a control signal to the lens driving unit based on the detected grip force, and the lens driving unit regulates a position of a zoom lens based on the provided control signal. Therefore, the subject 1160 included in the viewfinder image 1150 may be zoomed in or zoomed out.

As illustrated in FIG. 15B, the force sensor configured to detect a force with which the user grips the imaging device 100 may have the fifth force that is a maximum detectable force. Therefore, when the force with which the user grips the imaging device 100 is equal to or greater than the fifth force, the imaging device 100 may maximally zoom in the subject 1160 included in the viewfinder image 1150.

The example methods of operating an imaging device may, for example, be implemented in the form of program instructions that may be performed through various computer (e.g., processing) units and recorded in computer readable media. The computer readable media may include a program instruction, a data file, a data structure, or combinations thereof. The program instructions recorded in the media may be specially designed and configured for examples of the disclosure, or may be available well-known instructions for those skilled in the field of computer software. Examples of the computer readable media include magnetic media such as a hard disk, a floppy disk, and a magnetic tape, optical media such as a CD-ROM and a DVD, magneto-optical media such as a floptical disk, and a hardware device, such as a ROM, a RAM, or a flash memory, that may be specially made to store and perform the program instruction. Examples of the program instruction may include a machine code generated by a compiler and a high-level language code that can be executed in a computer using an interpreter.

According to an example, a force with which a user grips an imaging device may be detected in a sleep mode or a booting ready mode, booting may be performed quickly and accurately, and a subject may be imaged at a time at which the user intends to perform imaging.

According to an example, a reference force may be differently set based, for example, on a weight of a lens mounted on an imaging device. A user's intention of booting the imaging device may be accurately determined.

According to an example, a reference force may be differently set based, for example, on a base grip force with which the user grips the imaging device in a sleep mode. The user's intention of booting the imaging device may be accurately determined.

While examples have been described above in some detail, the scope of examples of the disclosure is not limited thereto, but encompasses several modifications and improvements by those skilled in the art using basic concepts of examples of the disclosure defined by the appended claims.

What is claimed is:

1. An imaging device, comprising:
    detection circuitry configured to detect a grip force applied to the imaging device; and
    a controller configured to set a reference force based on information of a lens mounted on the imaging device and to operate the imaging device in an imaging ready mode when the detected grip force is equal to or greater than the reference force,
    wherein the information of the lens includes information relating to a weight of the lens and the reference force is set based on at least the weight-related information.

2. The imaging device according to claim 1, further comprising
    an interface configured to receive the information of the lens mounted on the imaging device,
    wherein the interface is configured to transmit the received information of the lens to the controller.

3. The imaging device according to claim 1,
    wherein the controller is configured to set a first force as the reference force when a weight of the lens is less than a first value and to set a second force greater than the first force as the reference force when the weight of the lens is equal to or greater than the first value, based on the information of the lens.

4. The imaging device according to claim 1,
    wherein the controller includes a first controller and a second controller, and
    in the imaging ready mode, the second controller is configured to transmit a booting signal to the first controller, and the first controller that has received the booting signal is configured to wake up an image signal processor and to turn a viewfinder on.

5. The imaging device according to claim 1, further comprising:
    an eyepiece sensor configured to generate an eyepiece signal based on a proximity of a user's eye to a viewfinder; and
    an input configured to receive a user input,
    wherein the controller is configured to maintain the imaging ready mode when the eyepiece signal is detected or the user input is received in the imaging ready mode.

6. The imaging device according to claim 1,
    wherein the controller is configured to control an imaging sensor and to image a subject when an imaging request signal is received in the imaging ready mode.

7. The imaging device according to claim 1, further comprising:
    an eyepiece sensor configured to generate an eyepiece signal based on a proximity of a user's eye to a viewfinder; and
    an input configured to receive a user input,
    wherein the controller is configured to operate in a booting ready mode when no eyepiece signal is detected and no user input is received for a preset first time in the imaging ready mode.

8. The imaging device according to claim 7,
    wherein the controller is configured to operate in a sleep mode when no eyepiece signal is detected and no user input is received for a preset second time in the booting ready mode.

9. The imaging device according to claim 4,
    wherein the first controller and the second controller are configured to not operate in a sleep mode, and the first controller is configured to not operate in a low power mode in a booting ready mode, and the second controller is configured to operate in a low power mode in the booting ready mode.

10. The imaging device according to claim 8,
    wherein the controller is configured to be switched to the booting ready mode from the sleep mode when a grip force is detected in the sleep mode.

11. A method of operating an imaging device, comprising:
    setting a reference force based on information of a lens mounted on the imaging device;
    detecting a grip force applied to the imaging device; and
    operating the imaging device in an imaging ready mode when the detected grip force is equal to or greater than the reference force,
    wherein the information of the lens includes information relating to a weight of the lens and the reference force is set based on at least the weight-related information.

12. The method according to claim 11, further comprising:
    receiving the information of the lens from the lens mounted on the imaging device,
    wherein the setting of the reference force includes:
    setting the reference force based on the received information of the lens.

13. The method according to claim 11,
    wherein the setting of the reference force includes:
    setting a first force as the reference force when a weight of the lens is less than a first value and setting a second force greater than the first force as the reference force when the weight of the lens is equal to or greater than the first value, based on the information of the lens.

14. The method according to claim 11,
    wherein the operating in the imaging ready mode includes:
    transmitting, by a second controller of the imaging device, a booting signal to a first controller of the imaging device; and
    waking up an image signal processor and turning a viewfinder on by the first controller that has received the booting signal.

15. The method according to claim 11, further comprising
    detecting an eyepiece signal generated based on a proximity of a user's eye to a viewfinder or receiving a user input,
    wherein the operating in the imaging ready mode includes maintaining the imaging ready mode when the eyepiece signal is detected or the user input is received in the imaging ready mode.

16. The method according to claim 11, further comprising
    receiving an imaging request signal in the imaging ready mode; and
    controlling an imaging sensor included in the imaging device to image a subject.

17. The method according to claim 11, further comprising
    operating in a booting ready mode if an eyepiece signal generated based on a proximity of a user's eye to a viewfinder is not detected for a preset first time and a user input is not received for the preset first time in the imaging ready mode.

18. The method according to claim 17, further comprising operating in a sleep mode when the eyepiece signal is not detected for a preset second time and the user input is not received for the preset second time in the booting ready mode.

19. The method according to claim 18, further comprising disabling operations of a first controller and a second controller in the sleep mode, and disabling the operation of the first controller and operating the second controller in a low power mode in the booting ready mode.

20. The method according to claim 18, further comprising switching to the booting ready mode from the sleep mode when a grip force is detected in the sleep mode.

21. A non-transitory computer readable recording medium recording a program which, when executed by a computer of an imaging device, causes the imaging device to execute:

setting a reference force based on information of a lens mounted on the imaging device;

detecting a grip force applied to the imaging device; and operating the imaging device in an imaging ready mode when the detected grip force is equal to or greater than the reference force, wherein the information of the lens includes information relating to a weight of the lens and the reference force is set based on at least the weight-related information.

22. A method of operating an imaging device, comprising:

setting a reference force based on at least one of weight information of a lens mounted on the imaging device and base grip force information;

operating in a continuous imaging mode;

detecting a grip force applied to the imaging device; and changing a rate of the continuous imaging when the detected grip force is equal to or greater than the reference force.

23. A method of operating an imaging device, comprising:

setting a reference force based on at least one of weight information of a lens mounted on the imaging device and base grip force information;

operating in a video imaging mode;

detecting a grip force applied to the imaging device; and operating in a still image capturing mode when the detected grip force is equal to or greater than the reference force.

\* \* \* \* \*